United States Patent Office 2,789,841
Patented Apr. 23, 1957

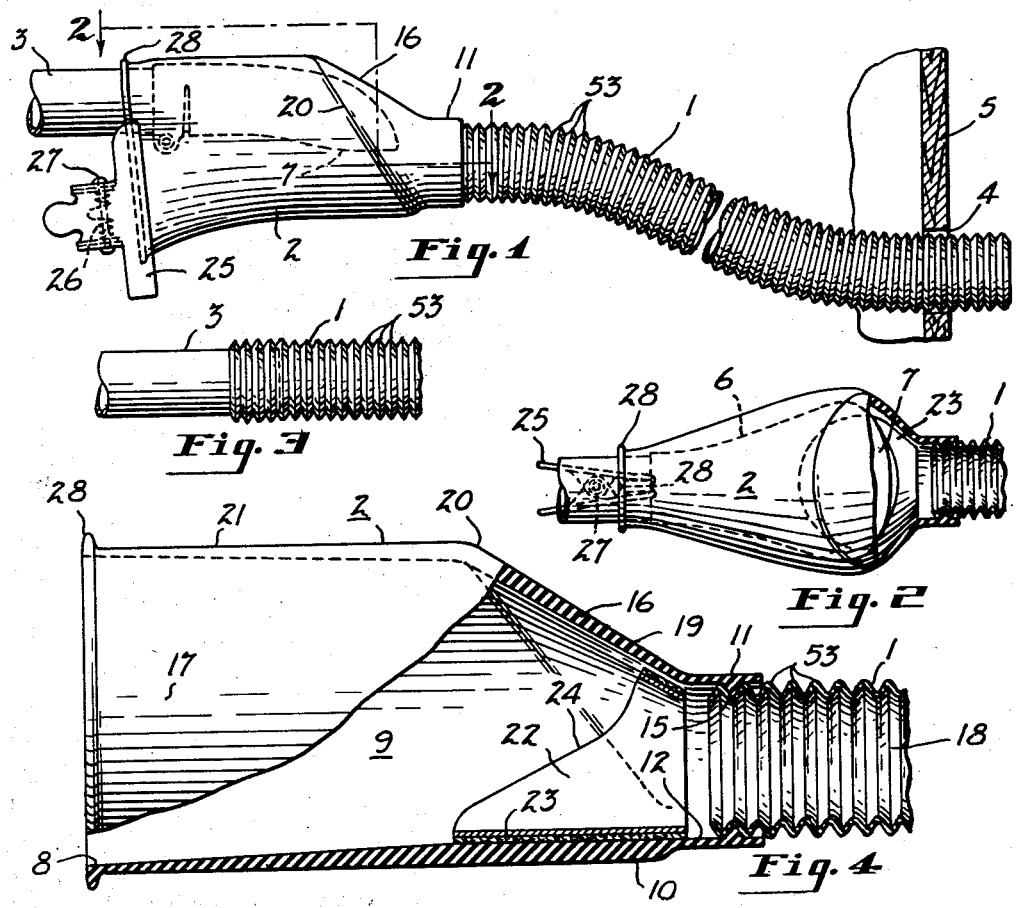

2,789,841

FLEXIBLE REDUCER BOOT

Vance M. Kramer, Cleveland, Ohio

Application November 13, 1951, Serial No. 256,107

8 Claims. (Cl. 285—177)

This invention relates to a device made of flexible and deformable rubber tubing for attachment to the exhaust or tail pipes of motor vehicles to receive and carry off gaseous products of combustion.

It has long been recognized that the gasoline engines of motor vehicles give off waste gaseous combustion products of a harmful and poisonous nature. So that persons working in garages and repair shops servicing motor vehicles will not be unduly exposed to these harmful exhaust gases it has been the custom to connect engines of vehicles being serviced to an exhaust conduit system arranged to carry off the gaseous products of combustion for discharge outside the building. Some systems employ a network of conduits submerged in the floor of the garage or service station or suspended overhead, the exhaust or tail pipes of the individual vehicles being connected as required into the conduit network by short lengths of flexible tubing. In other arrangements the exhaust from each vehicle is carried through a separate conduit directly to the outside atmosphere, the conduit usually taking the form of flexible tubing fitted over the end of the tail pipe of the engine and extending through the wall of the building.

Considerable difficulty has been experienced in fitting or adapting flexible conduits to the exhaust or tail pipes of the vehicles. This difficulty stems from variations in sizes and shapes of tail pipes and tail pipe ornaments and deflectors such as are encountered in automobiles of different ages and in different models of automobiles.

It is, therefore, the general aim of the present invention to overcome these and other objections and difficulties associated with prior exhaust tubes and to provide a length of laterally bendable or flexible tubing combined with a deformable adaptor fitting in such a manner that the tubing or conduit, by means of the adaptor on one end of the tubing, is readily secured to vehicle tail pipes of various shapes and sizes including those having enlargements or deflectors on their discharge ends. More specifically, this aspect of the invention is concerned with an adaptor that includes a deformable, preferably shape retaining, boot of rubber or the like having means for receiving and retaining one end of a flexible exhaust conduit and having a relatively large opening or mouth receivable over a vehicle tail pipe deflector, the adaptor including means for progressively closing the mouth of the boot so as to cause the latter to closely embrace or confine the tail pipe of the vehicle at a point spaced from the discharge end of the tail pipe.

Another object is to provide an improved tail pipe adaptor for flexible exhaust tubes which is unbreakable, does not mar or scratch the finish of a car, is light in weight, simple and easily manipulated in mounting on and dismounting from the tail pipe of a car and which incorporates means and is so designed as to minimize burning of the adaptor by the hot exhaust gases. In a simplified form the adaptor is essentially an open mouthed shape retaining rubber boot capable of being slid endwise over the tail pipe and tail pipe deflector of a motor vehicle by pressure applied at one end of the boot, and which, in combination with a length of flexible corrugated exhaust tubing having one end received in and embraced by the boot, embodies improved means for connecting the tubing to the tail pipe of the vehicle so that, while withstanding normal stresses and strains to which the combination is normally subjected, the parts will readily separate when subjected to extraordinary strain to prevent damage to the adaptor and tubing and to the vehicle to which the device is attached.

Other objects and advantages relate to certain novel features of construction and combinations and arrangements of parts which obtain simplicity and economy in manufacture as set forth in the following detailed description made in connection with the accompanying drawings that form a part of the specification.

In the drawings:

Figure 1 is a side elevational view, partly diagrammatic, partly in section and with parts broken away and removed, showing a boot adaptor-flexible conduit device embodying the principles of the present invention, the device being connected to the exhaust or tail pipe of an engine or vehicle to receive and carry off gaseous products of combustion through a wall or partition of the building;

Fig. 2 is a fragmentary plan view, partly in section and with parts broken away and removed, taken substantially along the line indicated at 2—2 of Fig. 1;

Fig. 3 is a fragmentary elevational detail showing a modification in which the flexible corrugated conduit or tube is connected to an engine exhaust or tail pipe by telescoping the tubing over such tail pipe; and Fig. 4 is a fragmentary side elevational view, partly in section and with parts broken away and removed, showing the adaptor-conduit device or combination of Fig. 1 removed from the engine tail pipe and enlarged with respect to that figure.

Generally described, the exhaust gas receiving and conducting device of the present invention, shown in use in Figs. 1 and 2, comprises a flexible corrugated rubber conduit or tube 1 and a rubber boot adaptor 2 that is received over tail pipe 3 of a motor vehicle or engine through which are discharged the gaseous products of combustion. The flexible conduit or tube 1 is of any suitable length and may extend to the receiving terminal of a network of permanent exhaust conduits (not shown) or may lead out of the building in which the engine or vehicle is located so as to discharge directly into the outside atmosphere as by being projected through an opening 4 in a partition or wall 5 of the building.

The boot or adaptor 2 is made as by molding of a suitable heat and oil resistant rubber or synthetic rubber compound, such as neoprene or a similar synthetic composition. The boot is of elongated character and is circular in cross section, or substantially so, throughout its length, although other cross sectional shapes more costly by reason of mold expense may be employed.

The rubber or rubber-like synthetic compound of which the boot is made is sufficiently stiff to impart shape retaining characteristics to the boot so that at normal room temperatures it is substantially self-supporting and does not appreciably collapse of its own weight. The compound selected for use is one of any well-known having sufficient toughness and tensile strength to withstand the rough treatment and general abuse to which the device normally is subjected in an automobile garage or repair shop. The shape retaining characteristic of the boot permits it to be held at only one end when sliding it into place over the discharge end of the tail pipe even though the tail pipe of the vehicle may be fitted with a stamped metal deflector 6 having a broad flared outlet end 7 which is tightly embraced by the walls of the boot 2 and may even require some distention of the boot walls in forcing the deflector through substantially the full length of the boot. Manipulation of the adaptor boot in fitting it to tail pipes and deflectors of different sizes and shapes is facilitated by walls of tapering thickness. As shown in Fig. 4 the walls of the boot are relatively thin adjacent the tail pipe receiving or left hand end of the adaptor as viewed in that figure, the left hand end being formed formed with or terminating in a relatively large opening 8 through which the tail pipe and deflector are introduced into open-ended chamber 9 of the boot. At the end of the adaptor boot opposite the large opening 8 the walls or a portion or portions of the walls are relatively thick as indicated at 10. That end of the adaptor boot having the thick wall 10 is formed with an integral cylindrical extension portion 11 having an internal substantially cylindrically walled passage or opening 12 that receives an end of the flexible conduit or tube 1, the cylindrical extension embracing the tube end to retain the latter in a frictional, substantially gas-tight grip. The cylindrical opening or passage 12 is continuous with the main chamber 9 of the adaptor boot so that gases discharged into the main chamber from the tail pipe and deflector 7 of the motor vehicle are conducted or guided by the adaptor walls directly into the conduit 1. Intermediate the ends of the cylindrical passage 12 the boot end portion 11 is formed with an integral circumferentially extending internal rib means or flange 15, preferably annular in extent, which is received between ridges 53 and within one of the grooves of the tube 1 in the provision of a mechanical interlock holding the parts together. The tube and the adaptor are, however, readily assembled and disassembled by manually deforming the tube to clear the rib 15.

The cylindrical opening 12 for receiving the flexible conduit or tube 1 is much smaller than the large opening 8 and is at the opposite end of the boot from the latter. By way of example, an adaptor for average garage use may have the outlet opening 12 about 2½ inches in diameter and the large opening 8 about 5 inches in diameter. The main portion of the adaptor boot chamber 9 is of substantially uniform cross sectional area corresponding to the area of the large opening 8 to accommodate the flared ends of tail pipe deflectors inserted into the adaptor. Adjacent the end having the outlet 12 the boot is formed with a tapered conical portion 16. This conical section of the boot is eccentric to the main or cylindrical portion of the boot, indicated at 21, so that center line 18 of the cylindrical small diameter opening 12 is laterally offset with respect to center line 17 of the large opening 8 and the main portion of the boot chamber. In this offset arrangement of the small outlet opening in the boot one portion or element of the cylindrical wall 12 of the small opening is substantially flush with one portion or element of the cylindrical wall of the main part 21 of the boot. The offset or eccentric shape permits a more direct flow of the exhaust gases from the deflector 7 (Fig. 1) into the flexible tube 1 and thereby minimizes objectionable burning of the adaptor 2. The major or main part 21 of the body of the tail pipe adaptor thus comprises a generally cylindrical tube. At one end this tube is open to receive the tail pipe and deflector. At the other or opposite end the tube is integrally jointed along a line indicated at 20 to the conically tapered end portion 16, the conical end being generated about an axis substantially parallel to but laterally offset from the axis of the cylindrical tube portion of the body. The line of intersection indicated at 20 between the cylindrical and conical portions is an ellipse located in a plane disposed at an acute angle to the axis of the cylindrical portion of the adaptor body and also to the axis of the conical tapered portion 16.

The thickest portions of the walls of the adaptor boot, indicated at 10, are located at and adjacent the juncture line 20 between the cylindrical portion or section 21 and the conical section 16. By reason of the oblique or slanting position of the juncture line 20 relative to the longitudinal axes or center lines 17 and 18 of the adaptor, it being understood that the thickest portions of the adaptor walls are at the juncture line and that the walls progressively decrease in thickness away from such juncture, there is provided in the top of the adaptor adjacent the outlet end a relatively thin wall portion 19 which is directly above that zone of the thick wall portion 10 having the heaviest section. This thin portion 19 facilitates distortion of the boot in fitting it over wide flared deflectors on vehicle tail pipes. Therefore, while the bottom walls of the adaptor boot taper or progressively increase in thickness from the left to right as viewed in Fig. 4, substantially to the small opening 12, the top wall of the boot first increases and then decreases in thickness. The thickest portion of the top wall is thus spaced from both ends and openings of the adaptor boot.

The integral extension portion 11 at the small outlet opening end of the adaptor boot has walls that are of substantially uniform thickness longitudinally and also around the entire circumferential extent of the extension. These walls of the extension are generally thinner than the adjoining walls of the convergent tapered portion of the boot so as to be of greater flexibility and deformability in receiving and retaining the flexible conduit 1.

The relatively thick bottom wall portion of the adaptor disposed adjacent and under the tail pipe or deflector 7 is highly resistant to the hot gases. It is desirable, however, in certain instances to provide supplemental protection for the internal wall surfaces of the boot against the hot gases. Such protection may desirably take the form of a tapered sleeve 22 of corrosion resistant sheet metal such as stainless steel and a surrounding insulating sleeve 23 of asbestos or similar heat resistant substance. The sheet metal sleeve 22 holds the asbestos separator 23 in place, both being shaped to cover a relatively large portion of the bottom wall of the boot or adaptor adjacent the outlet 12. The metal sleeve and the asbestos are relieved or cut away along the line indicated at 24 to leave the top wall of the adaptor boot substantially free and unobstructed so as to distort readily in conforming to different tail pipe deflectors. To assemble the heat resistant metal and asbestos sleeves they are slid axially into place through the large opening 8 in the adaptor boot and they are retained in place during use by frictional engagement with the rubber walls of the boot. When use of the heat resistant sleeves is precluded as by the shape of the tail pipe deflector, the sleeves are manually withdrawn.

In fitting the device of the present invention over the tail pipe of a motor vehicle a substantially gas-tight seal is effected about the tail pipe by drawing or pinching together the walls of the adaptor boot at or adjacent the end having the large opening 8. Any suitable means such as snap or slide fasteners may be used for progressively drawing together the side walls of the boot and holding them in a collapsed condition. A preferential arrangement incorporates a spring biased clamp 25 in combination. This clamp has opposed members or arms mounted on a common pivot pin 27 for movement toward and away from one another. The arms are urged together as by a helical coil spring 26 received over the pivot pin 27 that hinges the arms together. The ends of the arms are formed with broad clamping portions that extend in directions substantially parallel to the axis of the pin 27. These clamping portions have margins normally directed angularly toward one another so that the edges of the arms each make substantially line contact with the collapsed walls of the body of the boot 2, preferably being received over an integral outwardly directed retaining bead 28 formed about the large opening 8.

My copending application for patent, Serial Number 563,096, filed February 2, 1956, and now Patent Number 2,754,138 on Flexible Adaptor Boot for Tubing for Carrying Gaseous Exhaust of Motor Vehicles, describes and claims an alternative arrangement for closing and sealing the end opening of the adaptor through which the deflector of the tail pipe is inserted into the chamber of the body.

In accordance with the patent statutes the principles of the present invention may be utilized in various ways, numerous modifications and alterations being contemplated, substitution of parts and changes in construction being resorted to as desired, it being understood that the articles and combinations shown in the drawings and described above and the particular method set forth are given merely for purposes of explanation and illustration without intending to limit the scope of the claims to the specific details disclosed.

What I claim and desire to secure by Letters Patent of the United States is:

1. An adaptor for connecting a flexible conduit to a deflector equipped tail pipe of a motor vehicle, said adaptor comprising a shape retaining hollow rubber body having walls of tapering thickness, said body being formed with a relatively large opening receivable over a tail pipe and tail pipe deflector, said body also being formed with a relatively small opening for receiving one end of a flexible conduit, the walls of the body being generally thicker adjacent the small opening than they are adjacent the large opening, and a funnel shaped insert of heat resistant sheet metal within the body and closely confined by the walls of the latter adjacent the small opening, said insert being disposed to intercept hot gases discharged into the body from a vehicle tail pipe received in the latter to protect the walls of the body from such gases, the confined insert being frictionally engaged by the rubber body and thereby restrained against relative shifting.

2. An adaptor for connecting a flexible tube to a motor vehicle tail pipe having a flared gas deflector end, said adaptor comprising a tubular rubber body having at one end a generally cylindrically shaped wall defining a generally cylindrical deflector receiving chamber portion of greater axial length than diameter opening axially through said one end of the body, the other end of the body having a generally cylindrically shaped wall defining a tube receiving chamber portion opening axially through said other end of the body, said wall of the tube receiving portion being less in both internal and external diameters than the wall of the deflector receiving portion, the body having an intermediate tapering wall portion integrally connecting the cylindrical walls of the deflector and tube receiving chamber portions, the body having shape retaining stiffness to facilitate assembly of said wall of the tube receiving portion with a flexible tube and placement of the deflector end of a tail pipe within the deflector receiving chamber portion of the body through said one end, the cylindrical wall at said one end of the body being readily deformed and collapsed with portions of such collapsed wall disposed flatwise against one another to reduce the area of the opening in said one end and close the body wall at such one end about a tail pipe extending into the deflector receiving chamber portion, means carried by the adaptor for holding together said collapsed wall portions to keep the body wall so closed about a tail pipe while in use, and the deflector receiving chamber defining wall of the rubber body being adapted to return by inherent resiliency to its unstressed generally cylindrical shape upon release of the holding means to facilitate withdrawal of the adaptor from a tail pipe and whereby the adaptor is automatically readied for reuse.

3. An adaptor for connecting a flexible tube to a motor vehicle tail pipe having a flared gas deflector end, said adaptor comprising a tubular rubber body having at one end a generally cylindrically shaped wall defining a generally cylindrical deflector receiving chamber portion of greater axial length than diameter opening axially through said one end of the body, the other end of the body having a generally cylindrically shaped wall defining a tube receiving chamber portion opening axially through said other end, the axis of such tube receiving chamber portion being offset laterally with respect to the axis of the deflector receiving chamber portion, the body having an intermediate wall portion integrally connecting the cylindrically shaped walls of the deflector and tube receiving portions, the axis of the intermediate wall portion being oblique to the axes of both the deflector and tube receiving portions, the body having shape retaining stiffness to facilitate assembly of said wall of the tube receiving portion with a flexible tube and placement of the deflector end of a tail pipe within the deflector receiving chamber portion of the body through said one end, the cylindrical wall at said one end of the body being readily deformed and collapsed with portions of such collapsed wall disposed flatwise against one another to reduce the area of the opening in said one end and close the body wall at such one end about a tail pipe extending into the deflector receiving chamber portion, means carried by the adaptor for holding together said collapsed wall portions to keep the body wall so closed about a tail pipe while in use, and the deflector receiving chamber defining wall of the rubber body being adapted to return by inherent resiliency to its unstressed generally cylindrical shape upon release of the holding means to facilitate withdrawal of the adaptor from a tail pipe and whereby the adaptor is automatically readied for reuse.

4. An adaptor for connecting a flexible tube to a motor vehicle tail pipe having a flared gas deflector end, said adaptor comprising a tubular rubber body having at one end a generally cylindrically shaped wall defining a generally cylindrical deflector receiving chamber portion of greater axial length than diameter opening axially through said one end of the body, the other end of the body having a generally cylindrically shaped wall defining a tube receiving chamber portion opening axially through said other end, the axis of such tube receiving chamber portion being offset laterally with respect to the axis of the deflector receiving chamber portion, the body having an intermediate wall portion integrally connecting the cylindrically shaped walls of the deflector and tube receiving portions, the connection between the walls of the deflector receiving and intermediate portions being along a closed line lying in a plane oblique to the axis of the deflector receiving portion, the body having shape retaining stiffness to facilitate assembly of said wall of the tube receiving portion with a flexible tube and placement of the deflector end of a tail pipe within the deflector receiving chamber portion of the body through said one end, the cylindrical wall at said one end of the body being readily deformed and collapsed with portions of such collapsed wall disposed flatwise against one another to reduce the area of the opening in said one end and close the body wall at such one end about a tail pipe extending into the deflector receiving chamber portion, means carried by the adaptor for holding together said collapsed wall portions to keep the body wall so closed about a tail pipe while in use, and the deflector receiving chamber defining wall of the rubber body being adapted to return by inherent resiliency to its unstressed generally cylindrical shape upon release of the holding means to facilitate withdrawal of the adaptor from a tail pipe and whereby the adaptor is automatically readied for reuse.

5. An adaptor for connecting a flexible tube to a motor vehicle tail pipe having a flared gas deflector end, said adaptor comprising a tubular rubber body having at one end a generally cylindrically shaped wall defining a generally cylindrical deflector receiving chamber portion of greater axial length than diameter opening axially through said one end of the body, the other end of the body having a generally cylindrically shaped wall defining a tube receiving chamber portion opening axially through said other end, the internal diameter of the wall defining the tube receiving chamber portion being less than that of the wall defining the deflector receiving chamber portion, the body having an intermediate wall portion integrally connecting the cylindrically shaped walls of the deflector and tube receiving portions, the axis of the intermediate wall portion being oblique to the axes of both the deflector and tube receiving portions, the generator of the internal surface of the wall defining the tube receiving portion substantially coinciding with the generator of the internal surface of the wall of the deflector receiving portion at one point in the path of each such generators to minimize internal obstructions to the flow of engine exhaust gases from the deflector receiving portion to the tube receiving portion, the body having shape retaining stiffness to facilitate assembly of said wall of the tube receiving portion with a flexible tube and placement of the deflector end of a tail pipe within the deflector receiving chamber portion of the body through said one end, the cylindrical wall at said one end of the body being readily deformed and collapsed with portions of such collapsed wall disposed flatwise against one another to reduce the area of the opening in said one end and close the body wall at such one end about a tail pipe extending into the deflector receiving chamber portion, means carried by the adaptor for holding together said collapsed wall portions to keep the body wall so closed about a tail pipe while in use, and the deflector receiving chamber defining wall of the rubber body being adapted to return by inherent resiliency to its unstressed generally cylindrical shape upon release of the holding means to facilitate withdrawal of the adaptor from a tail pipe and whereby the adaptor is automatically readied for reuse.

6. An adaptor for connecting a flexible tube to a motor vehicle tail pipe having a flared gas deflector end, said adaptor comprising a tubular rubber body having at one end a generally cylindrically shaped wall defining a generally cylindrical deflector receiving chamber portion of greater axial length than diameter opening axially through said one end of the body, the other end of the body having a generally cylindrically shaped wall defining a tube receiving chamber portion opening axially through said other end, both internal and external diameters of the wall of the tube receiving portion being less than the corresponding diameters of the wall of the deflector receiving portion, the body having an intermediate wall of generally frusto-conical shape extending between the walls of the deflector and tube receiving portions, said intermediate wall being connected to the wall of the deflector portion along a closed line disposed in a plane oblique to the axis of the deflector chamber, the body having shape retaining stiffness to facilitate assembly of said wall of the tube receiving portion with a flexible tube and placement of the deflector end of a tail pipe within the deflector receiving chamber portion of the body through said one end, the cylindrical wall at said one end of the body being readily deformed and collapsed with portions of such collapsed wall disposed flatwise against one another to reduce the area of the opening in said one end and close the body wall at such one end about a tail pipe extending into the deflector receiving chamber portion, means carried by the adaptor for holding together said collapsed wall portions to keep the body wall so closed about a tail pipe while in use, and the deflector receiving chamber defining wall of the rubber body being adapted to return by inherent resiliency to its unstressed generally cylindrical shape upon release of the holding means to facilitate withdrawal of the adaptor from a tail pipe and whereby the adaptor is automatically readied for reuse.

7. An adaptor for connecting a flexible tube to a motor vehicle tail pipe having a flared gas deflector end, said adaptor comprising a tubular rubber body having at one end a generally cylindrically shaped wall defining a generally cylindrical deflector receiving chamber portion of greater axial length than diameter opening axially through said one end of the body, the other end of the body having a generally cylindrically shaped wall defining a tube receiving chamber portion opening axially through said other end of the body, said wall of the tube receiving portion being less in both internal and external diameters than the wall of the deflector receiving portion, the body having an intermediate tapering wall portion integrally connecting the cylindrical walls of the deflector and tube receiving chamber portions, the body having shape retaining stiffness to facilitate assembly of said wall of the tube receiving portion with a flexible tube and placement of the deflector end of a tail pipe within the deflector receiving chamber portion of the body through said one end, the wall defining the deflector receiving chamber portion progressively increasing in thickness from the one end toward the intermediate connecting portion of the body whereby the body wall has relatively greater flexibility adjacent said one end than adjacent the juncture between such deflector receiving chamber defining wall and the intermediate wall portion, the cylindrical wall at said one end of the body being readily deformed and collapsed with portions of such collapsed wall disposed flatwise against one another to reduce the area of the opening in said one end and close the body wall at such one end about a tail pipe extending into the deflector receiving chamber portion, means carried by the adaptor for holding together said collapsed wall portions to keep the body wall so closed about a tail pipe while in use, and the deflector receiving chamber defining wall of the rubber body being adapted to return by inherent resiliency to its unstressed generally cylindrical shape upon release of the holding means to facilitate withdrawal of the adaptor from a tail pipe and whereby the adaptor is automatically readied for reuse.

8. An adaptor for connecting a flexible tube to a motor vehicle tail pipe having a flared gas deflector end, said adaptor comprising a tubular rubber body having at one end a generally cylindrically shaped wall defining a generally cylindrical deflector receiving chamber portion of greater axial length than diameter opening axially through said one end of the body, the other end of the body having a generally cylindrically shaped wall defining a tube receiving chamber portion opening axially through said other end, both internal and external diameters of the wall of the tube receiving portion being less than the corresponding diameters of the wall of the deflector receiving portion, the body having an intermediate wall of generally frusto-conical shape extending between the walls of the deflector and tube receiving portions, said intermediate wall being connected to the wall of the deflector portion along a closed line disposed in a plane oblique to the axis of the deflector chamber, the body having shape retaining stiffness to facilitate assembly of said wall of the tube receiving portion with a flexible tube and placement of the deflector end of a tail pipe within the deflector receiving chamber portion of the body through said one end, the wall defining the deflector receiving chamber portion progressively increasing in thickness from the one end toward the intermediate connecting portion of the body whereby the body wall has relatively greater flexibility adjacent said one end than adjacent the juncture between such deflector receiving chamber defining wall and the intermediate wall portion, the cylindrical wall at said one end of the body being readily deformed and collapsed with portions of such collapsed wall disposed flatwise against one another to reduce the area of the opening in said one end and close the body wall at such one end about a tail pipe extending into the deflector receiving chamber portion, means carried by the adaptor for holding together said collapsed wall portions to keep the body wall so closed about a tail pipe while in use, and the deflector receiving chamber defining wall of the rubber body being adapted to return by inherent resiliency to its unstressed generally cylindrical shape upon release of the holding means to facilitate withdrawal of the adaptor from a tail pipe and whereby the adaptor is automatically readied for reuse.

References Cited in the file of this patent

UNITED STATES PATENTS

| | | |
|---|---|---|
| 290,045 | Hardy | Dec. 11, 1883 |
| 1,412,018 | Keller | Apr. 4, 1922 |
| 1,543,558 | Donald | June 23, 1925 |
| 1,860,521 | Anderson | May 31, 1932 |
| 1,939,204 | Conklin | Dec. 12, 1933 |
| 2,025,067 | Miller | Dec. 24, 1935 |
| 2,073,335 | Connell | Mar. 9, 1937 |
| 2,082,715 | Nadai | July 1, 1937 |
| 2,085,702 | Kitto | June 29, 1937 |
| 2,143,960 | Stalter et al. | Jan. 17, 1939 |
| 2,165,926 | Greene | July 11, 1939 |
| 2,248,898 | Ross et al. | July 8, 1941 |
| 2,250,967 | Riddle | July 29, 1941 |
| 2,366,067 | Smith | Dec. 26, 1944 |
| 2,455,470 | Collision | Dec. 7, 1948 |
| 2,467,922 | Woytal et al. | Apr. 19, 1949 |
| 2,507,535 | Madsen | May 16, 1950 |
| 2,522,630 | McCulloch | Sept. 19, 1950 |
| 2,667,372 | Gardner | Jan. 26, 1954 |

FOREIGN PATENTS

| | | |
|---|---|---|
| 114,982 | Australia | Apr. 1, 1942 |